(12) United States Patent
Kuo et al.

(10) Patent No.: US 11,644,650 B2
(45) Date of Patent: May 9, 2023

(54) OPTICAL LENS AND HEAD-MOUNTED DISPLAY DEVICE INCLUDING FIVE LENSES OF +--++ REFRACTIVE POWERS

(71) Applicant: Coretronic Corporation, Hsin-Chu (TW)

(72) Inventors: Tao-Hung Kuo, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 273 days.

(21) Appl. No.: 16/907,175

(22) Filed: Jun. 20, 2020

(65) Prior Publication Data

US 2020/0409037 A1    Dec. 31, 2020

Related U.S. Application Data

(60) Provisional application No. 62/866,633, filed on Jun. 26, 2019.

(30) Foreign Application Priority Data

Feb. 27, 2020  (CN) .......................... 202010122430.6

(51) Int. Cl.
    *G02B 27/01*    (2006.01)
    *G02B 13/00*    (2006.01)
    *G02B 9/60*     (2006.01)

(52) U.S. Cl.
    CPC .......... *G02B 13/0045* (2013.01); *G02B 9/60* (2013.01); *G02B 27/0172* (2013.01)

(58) Field of Classification Search
    CPC .............................. G02B 13/0045; G02B 9/60
    See application file for complete search history.

(56) References Cited

U.S. PATENT DOCUMENTS

| 8,587,869 | B2 | 11/2013 | Totani et al. |
| 10,310,270 | B2 | 6/2019 | Komatsu et al. |

(Continued)

FOREIGN PATENT DOCUMENTS

| CN | 101609208 B | * | 4/2011 |
| CN | 105278109 A | * | 1/2016 |

(Continued)

OTHER PUBLICATIONS

Office Action of Taiwan Counterpart Application, dated Mar. 29, 2021, pp. 1-6.

(Continued)

*Primary Examiner* — Wen Huang
(74) *Attorney, Agent, or Firm* — JCIPRNET

(57) ABSTRACT

An optical lens and a head-mounted display device including the optical lens are provided. The optical lens includes a first lens, a second lens, a third lens, a fourth lens, and a fifth lens sequentially arranged from a light exit side to a light incident side. An image generator is disposed at the light incident side. The optical lens is configured to receive an image light beam provided by the image generator. A stop is formed at the light exit side of the image light beam. At the stop, the image light beam has a minimum light beam cross-sectional area. The technical solution of the invention may be used to shorten an overall length of the optical lens, so as to reduce an appearance volume of the display.

17 Claims, 7 Drawing Sheets

(56) References Cited

U.S. PATENT DOCUMENTS

| | | |
|---|---|---|
| 2012/0200936 A1 | 8/2012 | Takagi et al. |
| 2018/0246333 A1 | 8/2018 | Cheng et al. |
| 2019/0064490 A1 | 2/2019 | Hua et al. |
| 2019/0187353 A1 | 6/2019 | Kuo et al. |

FOREIGN PATENT DOCUMENTS

| | | | |
|---|---|---|---|
| CN | 107976807 | 5/2018 | |
| CN | 106680989 | 12/2018 | |
| EP | 1385023 | 1/2004 | |
| JP | 2016051061 A * | 4/2016 | ........... G02B 25/001 |
| TW | 201901238 | 1/2019 | |
| WO | 2009059446 | 5/2009 | |
| WO | 2017121967 | 7/2017 | |
| WO | 2018220265 | 12/2018 | |
| WO | 2018226367 | 12/2018 | |
| WO | 2019054358 | 3/2019 | |
| WO | 2019079996 | 5/2019 | |

OTHER PUBLICATIONS

"Search Report of Europe Counterpart Application", dated Nov. 3, 2020, p. 1-p. 6.
Office Action of China Counterpart Application, dated Dec. 2, 2021, pp. 1-10.

* cited by examiner

OPTICAL LENS AND HEAD-MOUNTED DISPLAY DEVICE INCLUDING FIVE LENSES OF +--++ REFRACTIVE POWERS

CROSS-REFERENCE TO RELATED APPLICATION

This application claims the priority benefit of U.S. provisional application Ser. No. 62/866,633, filed on Jun. 26, 2019 and China application serial no. 202010122430.6, filed on Feb. 27, 2020. The entirety of the above-mentioned patent applications are hereby incorporated by reference herein and made a part of this specification.

BACKGROUND

Technical Field

The invention relates to an optical lens, and particularly to a head-mounted display device including the optical lens.

Description of Related Art

Displays with waveguides (for example, waveguide displays) may be sorted by their image sources, such as self-luminous panel configurations, transmissive panel configurations, reflective panel configurations, etc. In a waveguide display configured with a self-luminous or transmissive panel, an image light beam provided by a panel passes through an optical lens and enters a waveguide via a coupling entrance. Then, the image light beam is transmitted to a coupling exit of the waveguide, and then the image light beam is projected toward a human eye, so as to form an image. In a waveguide display configured with a reflective panel, with the configurations of various optical devices, an illumination light beam provided by a light source may irradiate onto a reflective panel after passing through a prism. The reflective panel may convert the illumination light beam into an image light beam, and may transmit the image light beam to an optical lens. The image light beam may then be guided into a waveguide. Next, the image light beam is transmitted to a coupling exit of the waveguide, and then the image light beam is projected to a human eye. A virtual image corresponding to the image generated by an image source (the panel) may be formed at a distance by using the optical lens, and the virtual image is imaged on a retina of the human eye. Sizes and weights of the optical lenses are critical in waveguide displays.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to an optical lens, which has advantages of small size, light weight, large viewing angle, and high resolution.

Other objects and advantages of the invention may be further illustrated by the technical features broadly embodied and described as follows. In order to achieve one or a portion of or all of the objects or other objects, an embodiment of the invention provides an optical lens, and the optical lens includes a first lens, a second lens, a third lens, a fourth lens, and a fifth lens sequentially arranged from a light exit side to a light incident side. An image generator is disposed at the light incident side. The optical lens is configured to receive an image light beam provided by the image generator. A stop is formed at the light exit side of the image light beam. At the stop, the image light beam has a minimum light beam cross-sectional area.

In order to achieve one or a portion of or all of the objects or other objects, another embodiment of the invention provides a head-mounted display device including an optical lens, an image generator, a stop and a waveguide element. The optical lens includes a first lens, a second lens, a third lens, a fourth lens, and a fifth lens sequentially arranged from a light exit side to a light incident side. The image generator is set at the light incident side. The optical lens is configured to receive an image light beam provided by the image generator. The stop is formed at the light exit side. At the stop, the image light beam has a minimum light beam cross-sectional area. The stop is formed at a coupling entrance of the waveguide element. The image light beam enters the waveguide element via the coupling entrance after passing through the stop, and then the image light beam is transmitted to a coupling exit of the waveguide element, followed by being projected to a target.

Based on the above description, the embodiments of the invention have at least one of following advantages or effects. In the exemplary embodiments of the invention, according to the design of the optical lens, the optical lens may have a shorter length, thereby reducing the volume of the display. In addition, materials of the lenses in the optical lens may be favourable in reducing the weight of the optical lens and therefore the weight of the display. Therefore, the optical lens of the invention may be desirable due to a smaller size, a lighter weight, a larger viewing angle, or a higher resolution.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are merely schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
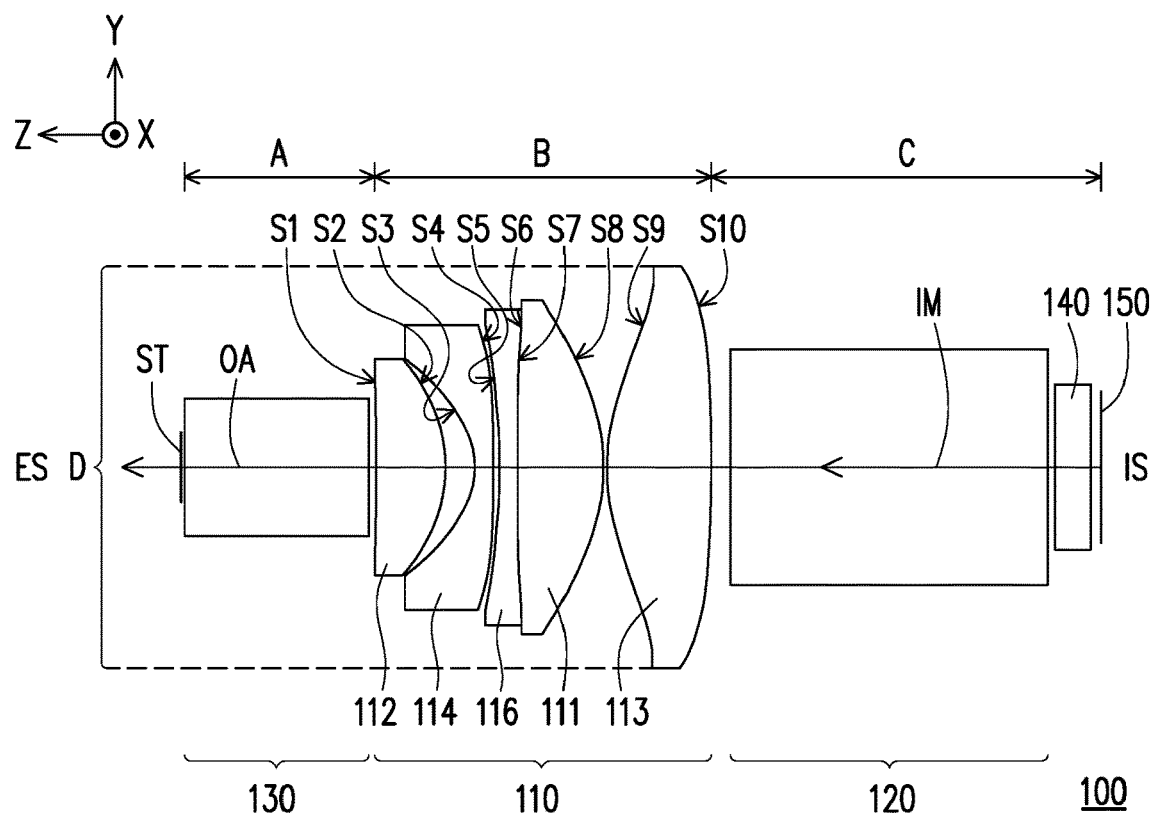
FIG. 1 is a schematic diagram of a head-mounted display device according to an embodiment of the invention.

FIG. 1 is a schematic diagram of a head-mounted display device according to an embodiment of the invention. Referring to FIG. 1, a head-mounted display device 100 of the embodiment may be a head-mounted display device including a waveguide element 130, but the invention is not limited thereto. In the embodiment, the head-mounted display device 100 includes an optical lens 110, an illumination prism (a second prism) 120, the waveguide element 130 and an image generator 150. The image generator 150 is disposed at a light incident side IS of the optical lens 110. The image generator 150 may be an image display device, such as a digital micromirror device (DMD), a reflective liquid crystal on silicon (LCoS), etc. In other embodiments, the image generator 150 may include a transmissive spatial light modulator such as a transparent liquid crystal panel. The image generator 150 may also include an organic light-emitting diode (OLED), a micro organic light-emitting diode (micro OLED), and/or a micro light-emitting diode (micro LED). The pattern or type of the image generator 150 is not limited by the invention. The illumination prism (the second prism) 120 may include a removable illumination prism 120, and the pattern or type of the illumination prism (the second prism) 120 is not limited by the invention. The illumination prism 120 may be disposed between the optical lens 110 and the image generator 150. An image light beam IM provided by the image generator 150 passes through the illumination prism 120 and enters the optical lens 110. The optical lens 110 is disposed to receive the image light beam IM. In the embodiment, a cover glass 140 may be disposed between the image generator 150 and the illumination prism 120, so as to prevent the image generator 150 from dust.

In the embodiment, after passing through the optical lens 110, the image light beam IM may be converged at a stop ST at a light exit side ES of the optical lens 110. In the embodiment, the stop ST is formed at the light exit side ES of the image light beam IM. At the stop ST, the image light beam IM has a minimum light beam cross-sectional area. For example, in the embodiment, the stop ST is, for example, circular, and with respect to a reference plane formed by an X-axis and a Y-axis, the stop ST may have consistent diameters along the X-axis direction and along the Y-axis direction. In the embodiment, the image light beam IM may be converged at the stop ST after passing through the optical lens 110. At the light column ST, the image light beam IM has the minimum light beam cross-sectional area. Therefore, the image light beam IM is converged at the stop ST after passing through the optical lens 110 and is diverged after passing through the stop ST. In the embodiment, the image light beam IM is transmitted to a coupling exit of the waveguide element 130 and is then projected to a default target. In an embodiment, the default target is, for example, a human eye.

In an embodiment, the optical lens 110 is complied with B×D<130. B is a total length of the optical lens 110, and D is a clear aperture of a largest lens in the optical lens 110. In the embodiment, D is, for example, a clear aperture of the first lens 112. In another embodiment, the optical lens 110 is complied with A+C<20. A is a distance between the stop ST and the optical lens 110 along an optical axis OA, as shown in FIG. 1, and A may be the distance between the stop ST and a light exit surface S1 of the first lens 112. C is a distance between the optical lens 110 and the image generator 150 along the optical axis OA, as shown in FIG. 1, and C may be the distance between a surface of the optical lens 110 (for example, S10) closest to the light incident side IS and the image generator 150 along the optical axis OA. In yet another embodiment, the optical lens 110 is complied with FOV/(B×D)>0.4. FOV is a field angle of the optical lens 110. In still another embodiment, the optical lens 110 is complied with FOV>50. In a further embodiment, the optical lens 110 is complied with B×D<130, A+C<20, FOV/(B×D)>0.4, and FOV>50. In the embodiment, the above parameters A, B, C, and D are, for example, respectively 5.8 mm, 10.17 mm, 11.76 mm, and 12.2 mm. The values of these parameters are for merely illustrative purposes and are not intended to be limiting of the invention. In the embodiment, the field angle of the optical lens 110 is about 60 degrees, for example, 58 degrees.

In the embodiment, the optical lens 110 includes a first lens 112, a second lens 114, a third lens 116, a fourth lens 111, and a fifth lens 113 sequentially arranged from the light exit side ES to the light incident side IS. Refractive powers of the first lens 112, the second lens 114, the third lens 116, the fourth lens 111, and the fifth lens 113 are sequentially positive, negative, negative, positive, and positive. In the embodiment, the first lens 112 may be a biconvex lens, the second lens 114 may be a convexo-concave lens, the third lens 116 may be a biconcave lens, the fourth lens 111 may be a biconvex lens, and the fifth lens 113 may be a biconvex lens. In a further embodiment, the third lens 116 and the fourth lens 111 may be formed into a cemented lens. In the embodiment, the first lens 112, the second lens 114, the fourth lens 111, and the fifth lens 113 may be glass aspherical lenses, and the third lens 116 may be a glass spherical lens. In another embodiment, the first lens 112 and the second lens 114 may also be plastic aspherical lenses.

An embodiment of the optical lens 110 is provided below. It should be noted that the data listed below is not intended to be limiting the invention, and any person skilled in the art may make appropriately changes to the parameters or settings after referring to the invention, which are still considered to be within the scope of the invention.

TABLE 1

| Device | Surface | Curvature (1/mm) | Space (mm) | Refractive index | Abbe number |
|---|---|---|---|---|---|
| First lens 112 | S1 | 0.02 | 2.12 | 1.9 | 21 |
|  | S2 | −0.22 | 0.89 |  |  |
| Second lens 114 | S3 | −0.45 | 0.55 | 1.9 | 21 |
|  | S4 | 0.01 | 0.20 |  |  |
| Third lens 116 | S5 | −0.05 | 0.55 | 1.96 | 17 |
|  | S6 | 0.01 | 0 |  |  |
| Fourth lens 111 | S7 | 0.01 | 2.60 | 1.77 | 50 |
|  | S8 | −0.17 | 0.10 |  |  |
| Fifth lens 113 | S9 | 0.15 | 3.17 | 1.77 | 50 |
|  | S10 | −0.014 | 0.56 |  |  |

Referring to FIG. 1 and Table 1, surfaces of each of the lenses (including the first lens 112 to the fifth lens 113) are listed in Table 1. For example, the surface S1 is a surface of the first lens 112 facing the light exit side ES, and the surface S2 is a surface of the first lens 112 facing the light incident side IS, and the others may be deduced by analogy. Moreover, "Space" refers to the distance straight between two adjacent surfaces along the optical axis OA. For example, the space corresponding to the surface S1 represents a distance straight from the surface S1 to the surface S2 along the optical axis OA, and the space corresponding to the surface S2 represents a distance straight from the surface S2 to the surface S3 along the optical axis OA, and the others may be deduced by analogy.

In the embodiment, the first lens 112, the second lens 114, the fourth lens 111, and the fifth lens 113 may be aspherical lenses. An equation of the aspherical lens is as follows:

$$X = \frac{Y^2}{R\left(1 + \sqrt{1-(1+k)*Y^2/R^2}\right)} + A_2Y^2 + A_4Y^4 + A_6Y^6 + A_8Y^8 + A_{10}Y^{10} + A_{12}Y^{12}\ldots$$

In the above equation, X is a sag in a direction of the optical axis OA, and R is the radius of an osculating sphere, i.e., the radius near the optical axis OA (a reciprocal of the radius listed in Table 1). "k" is the conic coefficient, Y is an aspheric height (i.e., a height from a lens center to a lens edge), and coefficients $A_2, A_4, A_6, A_8, A_{10}, A_{12}$ are aspheric coefficients. In the embodiment, the coefficient $A_2$ is 0. A following Table 2 lists parameter values of the surfaces of each of the lenses. The coefficients k, $A_4$, $A_6$, $A_8$, $A_{11}$, and $A_{12}$ of the surfaces S5, S6, and S7 are 0.

TABLE 2

|  | S1 | S2 | S3 | S4 | S8 | S9 | S10 |
|---|---|---|---|---|---|---|---|
| k | 0 | 0 | −8.06E−01 | 0 | 0 | 0 | 0 |
| A4 | −2.05E−03 | 6.37E−04 | 1.10E−02 | −2.30E−03 | 1.08E−03 | −1.35E−03 | −1.41E−04 |
| A6 | 1.57E−04 | −1.74E−05 | −1.30E−03 | 6.04E−05 | 1.06E−05 | −2.31E−06 | −2.48E−05 |
| A8 | −1.45E−05 | −4.35E−06 | 1.20E−04 | 1.66E−07 | 1.84E−08 | 1.09E−07 | 1.26E−06 |
| A10 | 5.68E−07 | 9.47E−07 | −5.40E−06 | −9.61E−08 | −1.81E−08 | −3.06E−09 | −3.05E−08 |
| A12 | 9.18E−09 | −3.69E−08 | 8.25E−08 | 2.29E−09 | 7.74E−10 | −1.65E−10 | 2.12E−10 |

Figure 2A:
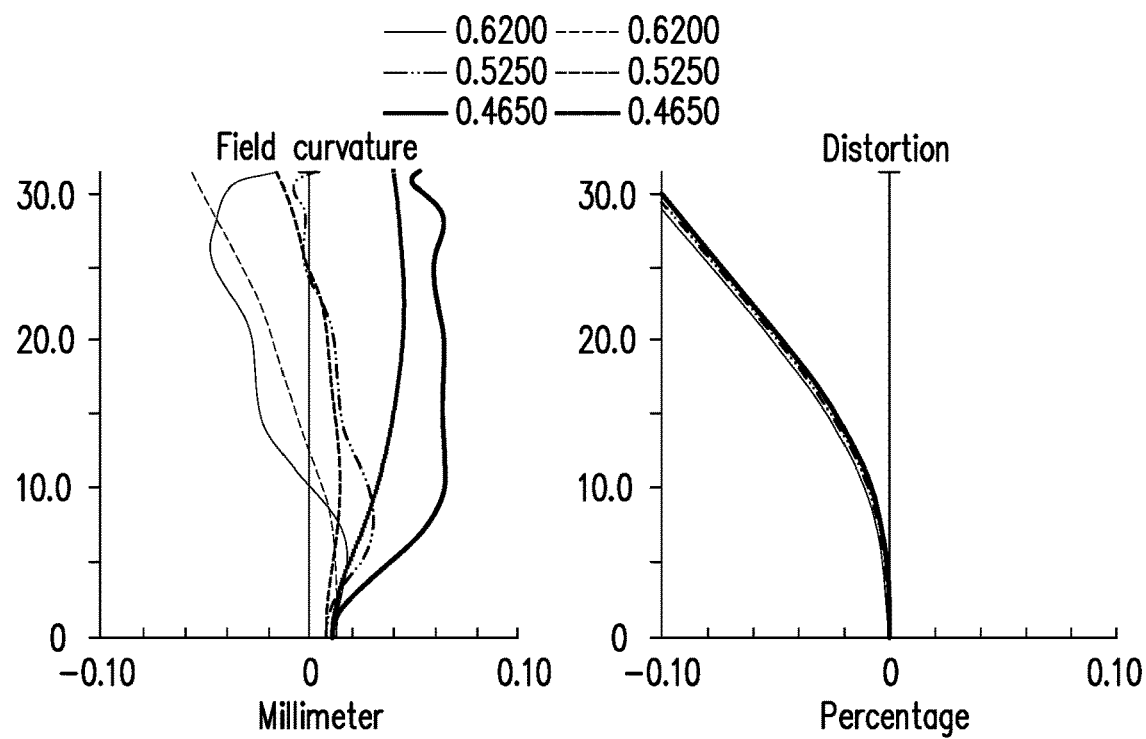
FIG. 2A is an astigmatic field curvature diagram and a distortion diagram of an optical lens of the head-mounted display device of FIG. 1.
Figure 2B:
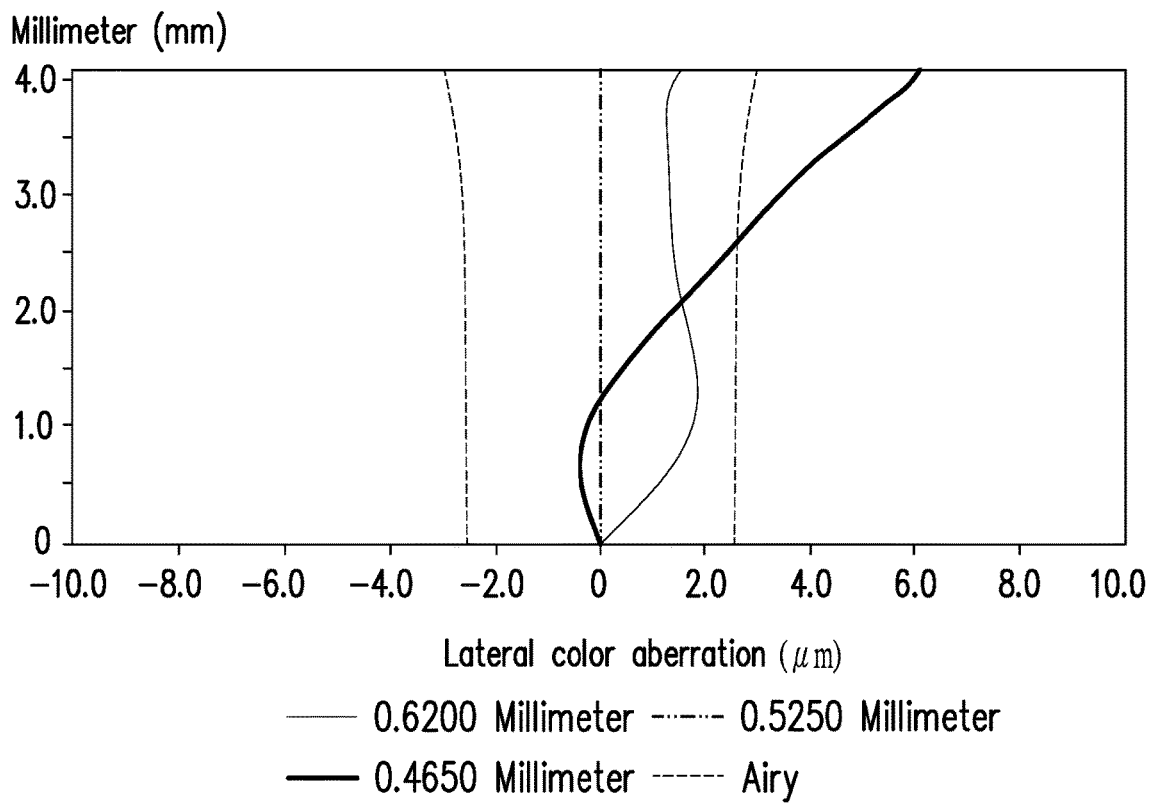
FIG. 2B is a lateral color aberration diagram of the optical lens of the head-mounted display device of FIG. 1.
Figure 2C:
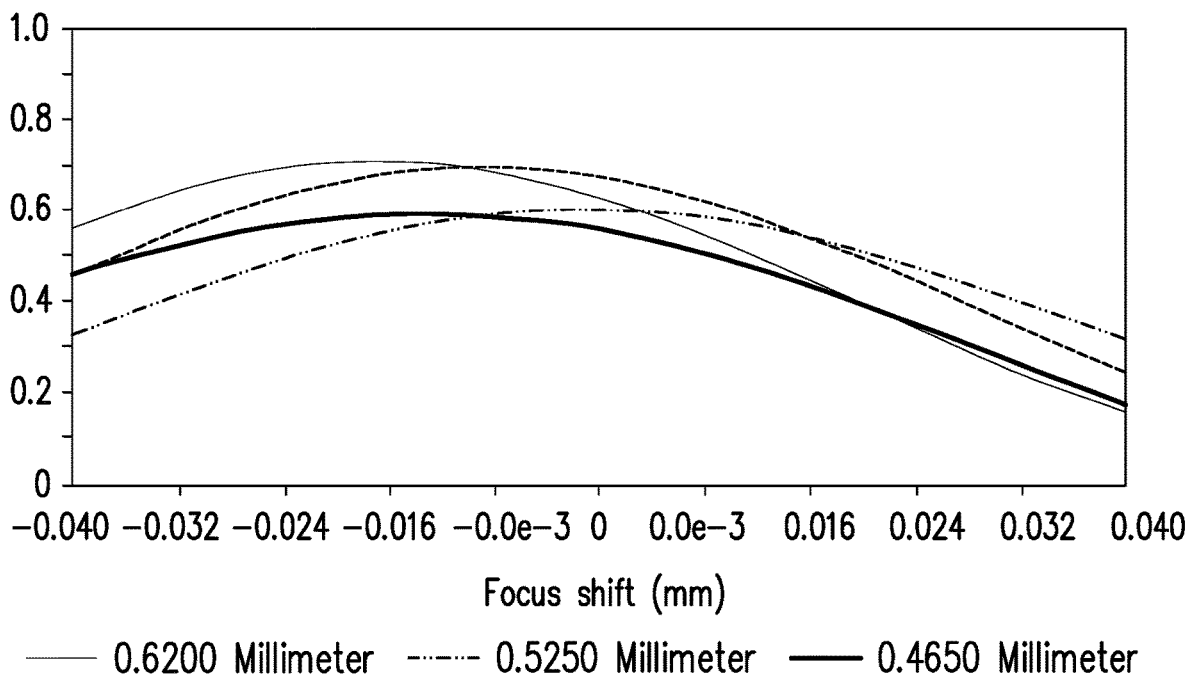
FIG. 2C is a modulation transfer function curve diagram of the optical lens of the head-mounted display device of FIG. 1.
Figure 2D:
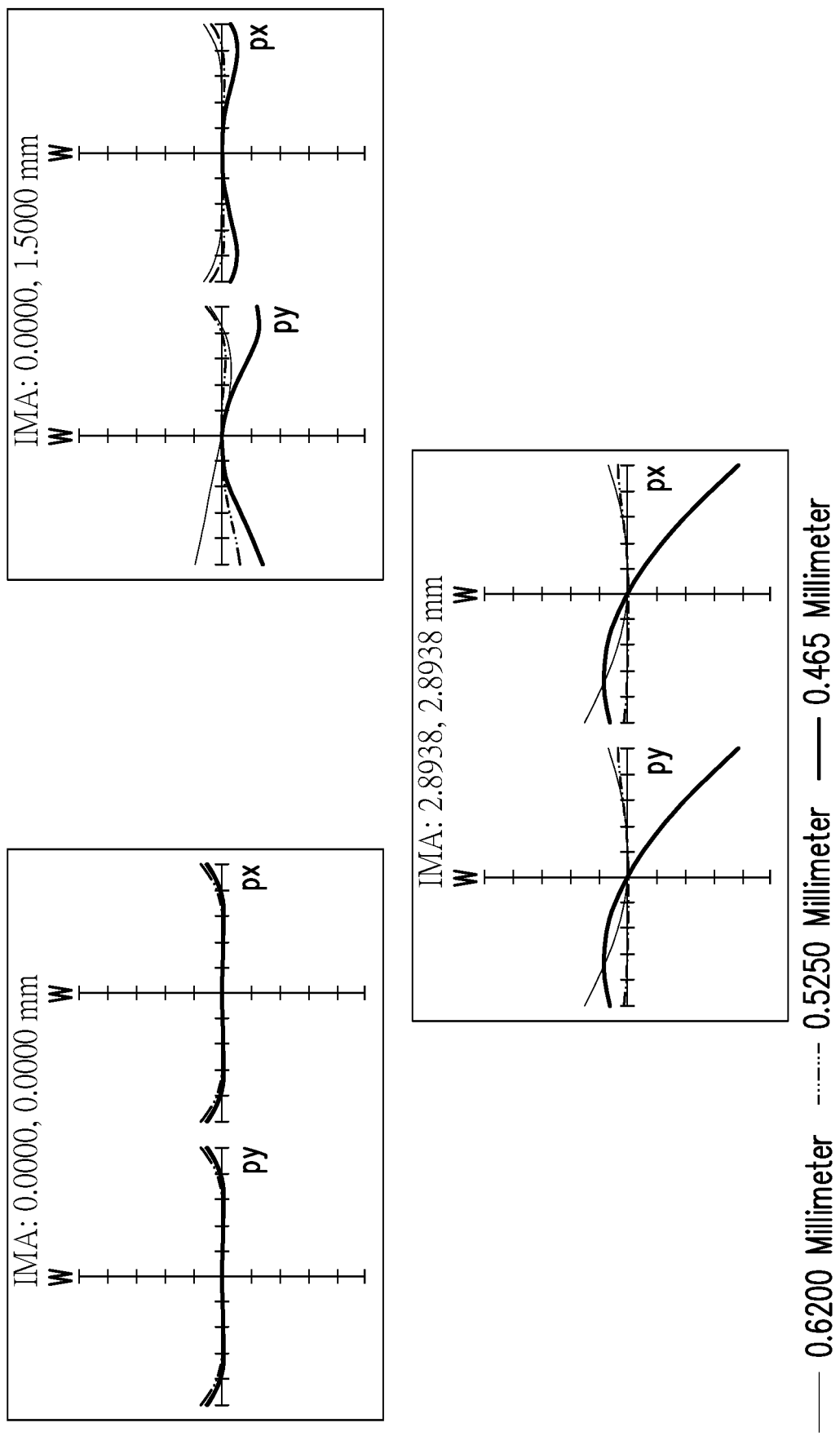
FIG. 2D is an optical path difference (OPD) diagram of the optical lens of the head-mounted display device of FIG. 1.

FIG. 2A is an astigmatic field curvature diagram and a distortion diagram of the optical lens of the head-mounted display device of FIG. 1. FIG. 2B is a lateral color aberration diagram of the optical lens of the head-mounted display device of FIG. 1. FIG. 2B shows simulation data based on light beams of wavelengths of 465 nm, 525 nm, and 620 nm. The horizontal coordinates represent lateral color aberrations, and the vertical coordinates represent image heights. FIG. 2C is a modulation transfer function curve diagram of the optical lens of the head-mounted display device of FIG. 1. The horizontal coordinates represent focus shifts, and the vertical coordinates represent moduli of an optical transfer function (OTF). FIG. 2D is an optical path difference (OPD) diagram of the optical lens of the head-mounted display device of FIG. 1. The figures shown in FIG. 2A to FIG. 2D are all within a standard range, and it is verified that the optical lens 110 of the embodiment may achieve better imaging effect. Moreover, as shown in FIG. 2D, on an active surface of the image generator 150, an OPD range of the image light beam IM is −2.0λ<OPD<2.0λ. OPD is an optical path difference at each field angle, λ is a wavelength of each color light, and the image light beam IM includes red light, green light, and blue light. The active surface of the image generator 150 may be a surface from which the image light beam IM exits. Further, when designing an optical lens, such as by means of optical simulation to reversely deduce from an object plane, those skilled in the art may easily obtain the optical path differences of image light beams at various field angles. In the embodiment, the field angle is designed and optimized to 60 degrees of FOV, such that better FOV coverage may be achieved. A ratio of the field angle per unit cross-sectional area may be higher, and the ratio may reach 0.49 (degrees/square millimeter), so that the optical lens 110 is thinner, lighter, shorter, smaller in volume and/or has a higher effective spatial utilization rate. In the embodiment, the design of the optical lens 110 is complied with a preset specification, and the optical lens 110 may be utilized to analyze images with a resolution of at least 931 p/mm (as shown in FIG. 2C). Therefore, the optical lens 110 may have a smaller size, a lighter weight, a larger viewing angle and/or a higher resolution.

Figure 3:
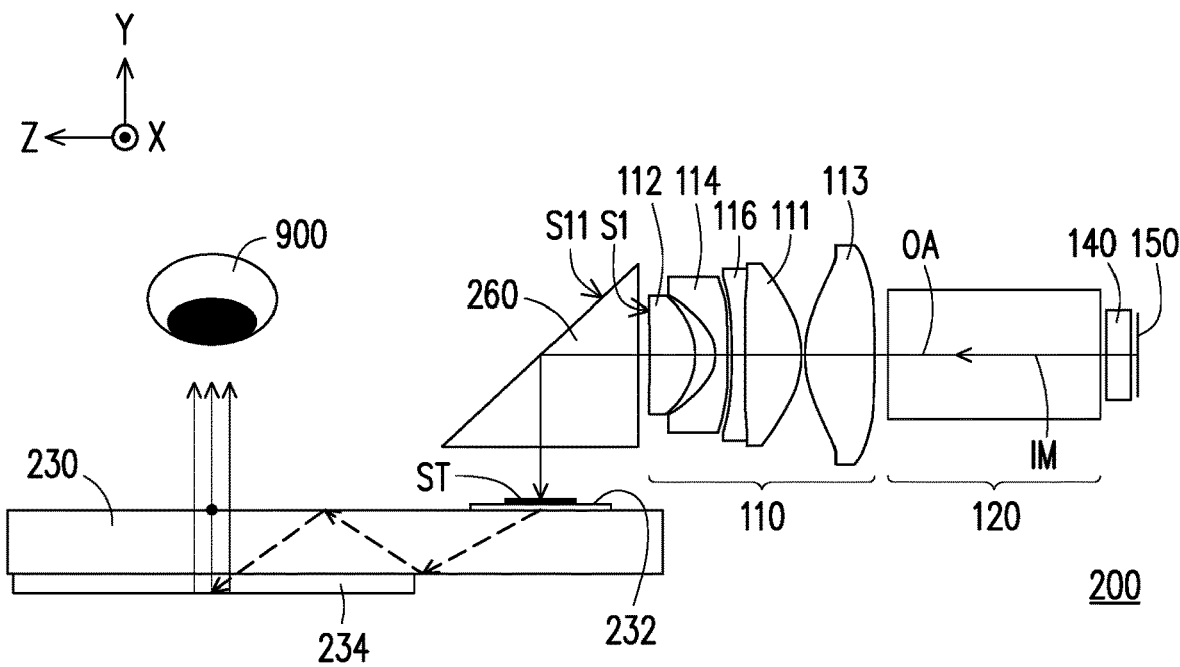
FIG. 3 is a schematic diagram of a head-mounted display device according to another embodiment of the invention.

FIG. 3 is a schematic diagram of a head-mounted display device according to another embodiment of the invention. Referring to FIG. 3, the head-mounted display device 200 of the embodiment is similar to the head-mounted display device 100 of FIG. 1, and the main difference there between may lie in the turning prism 260 (a first prism) and a waveguide element 230 disposed in the head-mounted display device 200. In the embodiment, the turning prism 260 is disposed between the optical lens 110 and the stop ST. The image light beam IM leaves the optical lens 110, and changes a transmitting direction after passing through the turning prism 260, and is converged at the stop ST. The image light beam IM is diverged after passing through the stop ST. In the embodiment, the waveguide element 230 includes a coupling entrance 232 and a coupling exit 234. The coupling entrance 232 and the coupling exit 234 are, for example, respectively a surface area where the image light beam enters the waveguide element 230 and a surface area where the image light beam leaves the waveguide element 230. The stop ST is formed at the coupling entrance 232 of the waveguide element 230. The image light beam IM enters the waveguide element 230 via the coupling entrance 232 after passing through the stop ST, and is transmitted to the coupling exit 234 of the waveguide element 230, and then is projected to a target 900. The target 900 is, for example, a human eye. In the embodiment, the waveguide element 230 includes optical microstructure (not shown). The optical microstructures are disposed at the coupling exit 234, and/or may also be disposed at the coupling entrance 232. The optical microstructures at the coupling exit 234 project the image light beam IM transmitted to the coupling exit 234 to the target 900.

In one embodiment, the optical lens 110 is complied with B×D<130. In another embodiment, the optical lens 110 is complied with A+C<20. In a further embodiment, the optical lens 110 is complied with FOV/(B×D)>0.4. In a still another embodiment, the optical lens 110 is complied with FOV>50. In yet another embodiment, the optical lens 110 is complied with B×D<130, A+C<20, FOV/(B×D)>0.4, and FOV>50. A is a distance between the stop ST and the optical lens 110 along the optical axis OA. In the embodiment, A is a sum of a distance between the surface S1 of the first lens 112 and a surface S11 of the turning prism 260 along the optical axis OA and a distance between the surface S11 of the turning prism 260 and a surface of the stop ST along the optical axis OA. In the embodiment, the above parameters A, B, C and D are, for example, respectively 5.8 mm, 10.17 mm, 11.76 mm, and 12.2 mm. The values of these parameters are merely for illustrative purposes and are not intended to be limiting of the invention.

Figure 4:
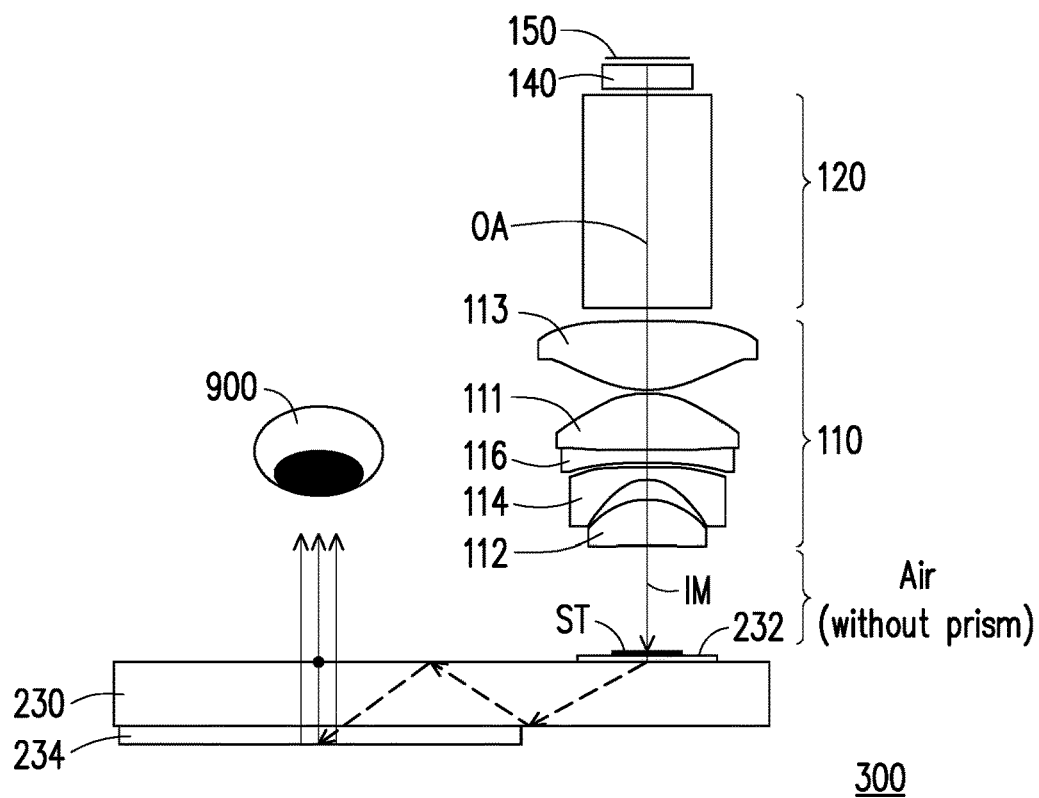
FIG. 4 is a schematic diagram of a head-mounted display device according to another embodiment of the invention.

FIG. 4 is a schematic diagram of a head-mounted display device according to another embodiment of the invention. Referring to FIG. 4, a head-mounted display device 300 of the embodiment is similar to the head-mounted display device 100 of FIG. 1, and the main difference there between may lie in the design of the waveguide element 230. Moreover, in the embodiment, there is no glass block or prism between the stop ST and the first lens 112. The image light beam IM is transmitted through the air after leaving the optical lens 110 and is converged at the stop ST.

In one embodiment, the optical lens 110 is complied with B×D<130. In another embodiment, the optical lens 110 is complied with A+C<20. In a further embodiment, the optical lens 110 is complied with FOV/(B×D)>0.4. In a still another embodiment, the optical lens 110 is complied with FOV>50. In yet another embodiment, the optical lens 110 is complied with B×D<130, A+C<20, FOV/(B×D)>0.4, and FOV>50. In the embodiment, the above parameters A, B, C and D are, for example, respectively 3.8 mm, 10.17 mm, 11.76 mm, and 12.2 mm. The values of these parameters are for merely illustrative purposes and are not intended to be limiting of the invention.

Figure 5:
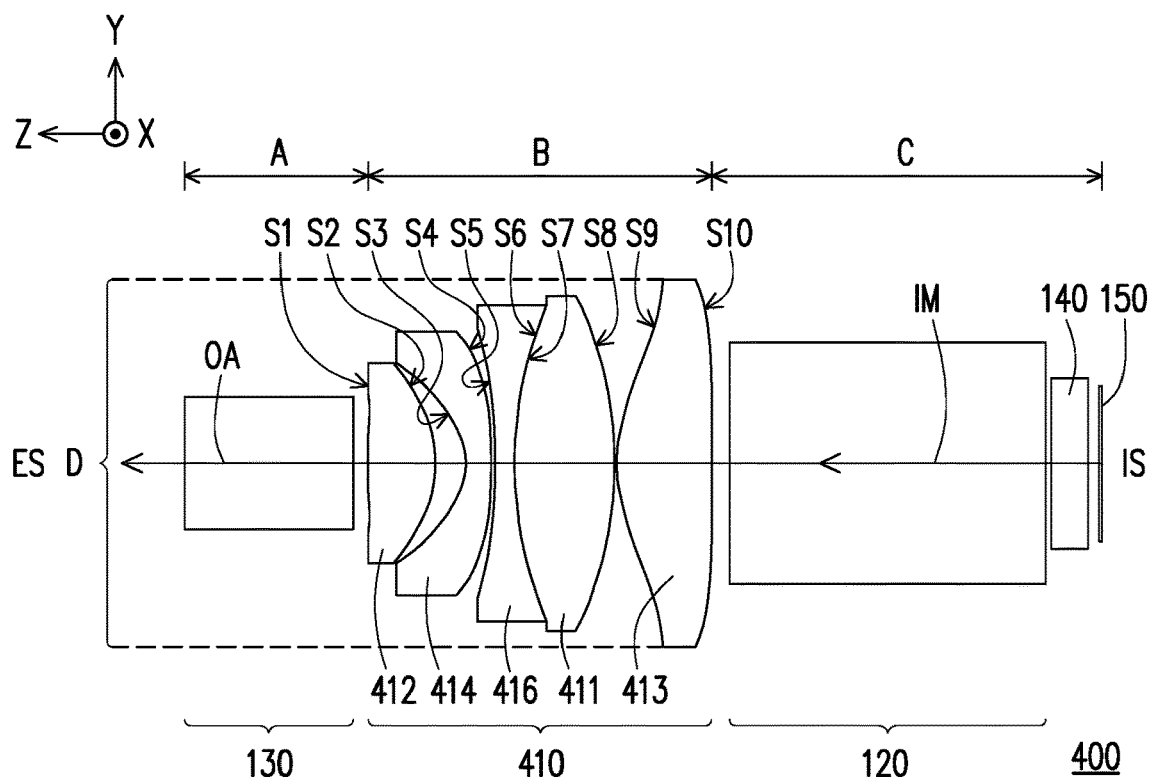
FIG. 5 is a schematic diagram of a head-mounted display device according to yet another embodiment of the invention.

FIG. 5 is a schematic diagram of a head-mounted display device according to yet another embodiment of the invention. Referring to FIG. 5, a head-mounted display device 400 of the embodiment is, for example, a head-mounted display device including the waveguide element 130, but the invention is not limited thereto. In the embodiment, the head-mounted display device 400 includes an optical lens 410, the illumination prism (the second prism) 120, the waveguide element 130, and the image generator 150. The image generator 150 is provided on the light incident side IS. The illumination prism 120 is disposed between the optical lens 410 and the image generator 150. The image light beam IM provided by the image generator 150 passes through the illumination prism 120 to enter the optical lens 410. The optical lens 410 is adapted to receive the image light beam IM. In the embodiment, the cover glass 140 is configured between the image generator 150 and the illumination prism 120 to protect the image generator 150 from dust.

The head-mounted display device 400 of the embodiment is similar to the head-mounted display device 100 of the embodiment shown in FIG. 1, and the main differences there-between are as followed. In the embodiment, the first lens 412 and the second lens 414 are plastic aspherical lenses, the third lens 416 is a glass spherical lens, and the fourth lens 411 and the fifth lens 413 are glass aspherical lenses. Use of plastic lenses to implement the first lens 412 and the second lens 414 may reduce the difficulty in fabrication.

An embodiment of the optical lens 410 is provided below. It should be noted that the data listed below is not intended to be limiting of the present invention, and any person skilled in the art may make appropriate changes to the parameters or settings after referring to the invention, which are still considered to be within the scope of the invention.

TABLE 3

| Device | Surface | Curvature (1/mm) | Space (mm) | Refractive index | Abbe number |
|---|---|---|---|---|---|
| First lens 412 | S1 | 0.02 | 1.97 | 1.66 | 20 |
| | S2 | −0.28 | 0.93 | | |
| Second lens 414 | S3 | −0.53 | 0.76 | 1.66 | 20 |
| | S4 | −0.04 | 0.10 | | |
| Third lens 416 | S5 | −0.06 | 0.59 | 1.81 | 23 |
| | S6 | 0.08 | 0 | | |
| Fourth lens 411 | S7 | 0.08 | 2.94 | 1.77 | 50 |
| | S8 | −0.09 | 0.1 | | |
| Fifth lens 413 | S9 | 0.18 | 2.84 | 1.77 | 50 |
| | S10 | −0.02 | 0.5 | | |

Referring to FIG. 5 and Table 3, surfaces of each of the lenses (including the first lens 412 to the fifth lens 413) are listed in Table 3. For example, the surface S1 is a surface of the first lens 412 facing the light exit side ES, and the surface S2 is a surface of the first lens 412 facing the light incident side IS, and the others may be deduced by analogy. Moreover, "space" refers to the distance straight between two adjacent surfaces along the optical axis OA. For example, the space corresponding to the surface S1 represents a distance straight from the surface S1 to the surface S2 along the optical axis OA, and the space corresponding to the surface S2 represents a distance from straight the surface S2 to the surface S3 along the optical axis OA, and the others may be deduced by analogy.

In the embodiment, the first lens 412, the second lens 414, the fourth lens 411, and the fifth lens 413 may be aspherical lenses. An equation of an aspherical lens is as follows:

$$X = \frac{Y^2}{R\left(1 + \sqrt{1-(1+k)*Y^2/R^2}\right)} + A_2 Y^2 + A_4 Y^4 +$$

$$A_6 Y^6 + A_8 Y^8 + A_{10} Y^{10} + A_{12} Y^{12} \ldots + A_{14} Y^{14} + A_{16} Y^{16}$$

In the above equation, X is a sag along the direction of the optical axis OA, and R is the radius of an osculating sphere, i.e., the radius near the optical axis OA (a reciprocal of the radius listed in Table 3). k is a conic coefficient, Y is an aspheric height (i.e., a height from a lens center to a lens edge), and coefficients $A_2, A_4, A_6, A_8, A_{10}, A_{12}, A_{14}, A_{16}$ are aspheric coefficients. In the embodiment, the coefficient $A_2$ is 0. The following Table 4 lists parameter values of the surfaces of each of the lenses. The coefficients k, $A_4, A_6, A_8, A_{10}$, and $A_{12}$ of the surfaces S5, S6, and S7 are 0.

TABLE 4

|     | S1        | S2        | S3        | S4        | S8        | S9        | S10       |
|-----|-----------|-----------|-----------|-----------|-----------|-----------|-----------|
| k   | −4.68E+01 | −2.72E−01 | −8.61E−01 | −4.78E+01 | −4.13E+00 | −9.47E−01 | −9.90E+01 |
| A4  | −1.97E−03 | 3.99E−03  | 1.95E−02  | −3.47E−03 | 9.24E−05  | −1.72E−03 | 8.76E−04  |
| A6  | −2.65E−06 | 6.63E−04  | −1.28E−03 | −1.17E−04 | −2.40E−05 | 1.76E−05  | −1.06E−04 |
| A8  | 1.47E−05  | −4.59E−04 | −7.25E−04 | −1.69E−05 | 8.08E−08  | 4.65E−07  | 6.47E−06  |
| A10 | 3.56E−06  | 9.52E−05  | 2.12E−04  | 6.81E−06  | 2.13E−08  | −8.60E−08 | −3.21E−07 |
| A12 | −1.42E−06 | −8.68E−06 | −2.33E−05 | −6.32E−07 | −8.25E−10 | 2.12E−09  | 9.53E−09  |
| A14 | 1.77E−07  | 3.27E−07  | 1.13E−06  | 2.44E−08  | 1.92E−11  | 5.86E−13  | −1.48E−10 |
| A16 | −6.74E−09 | −1.94E−09 | −1.96E−08 | −3.46E−10 | −1.61E−13 | −2.61E−13 | 9.90E−13  |

Figure 6A:
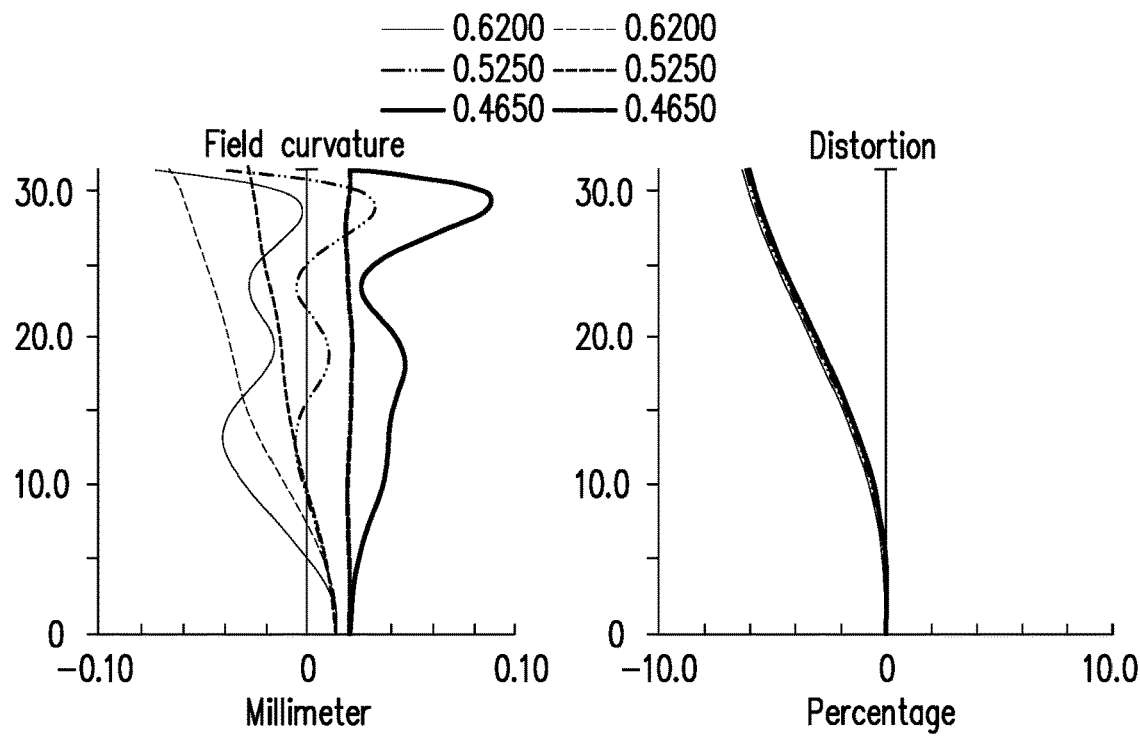
FIG. 6A is an astigmatic field curvature diagram and a distortion diagram of an optical lens of the head-mounted display device of FIG. 5.
Figure 6B:
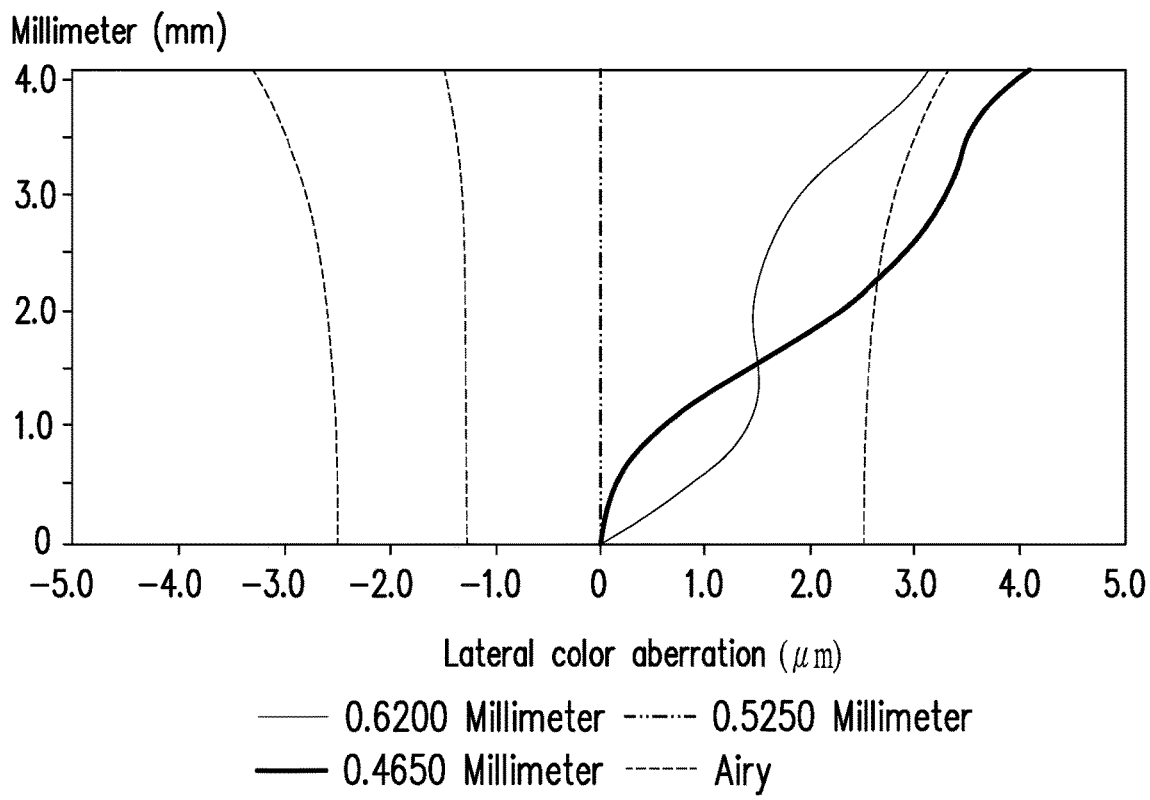
FIG. 6B is a lateral color aberration diagram of the optical lens of the head-mounted display device of FIG. 5.
Figure 6C:
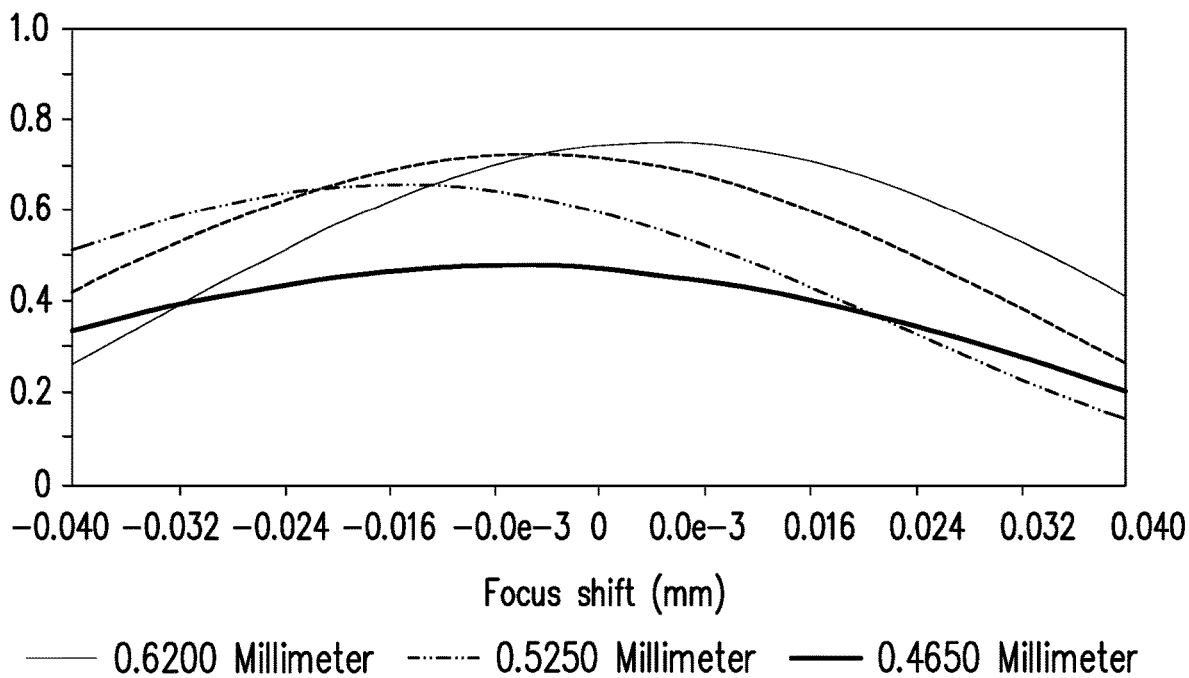
FIG. 6C is a modulation transfer function curve diagram of the optical lens of the head-mounted display device of FIG. 5.
Figure 6D:
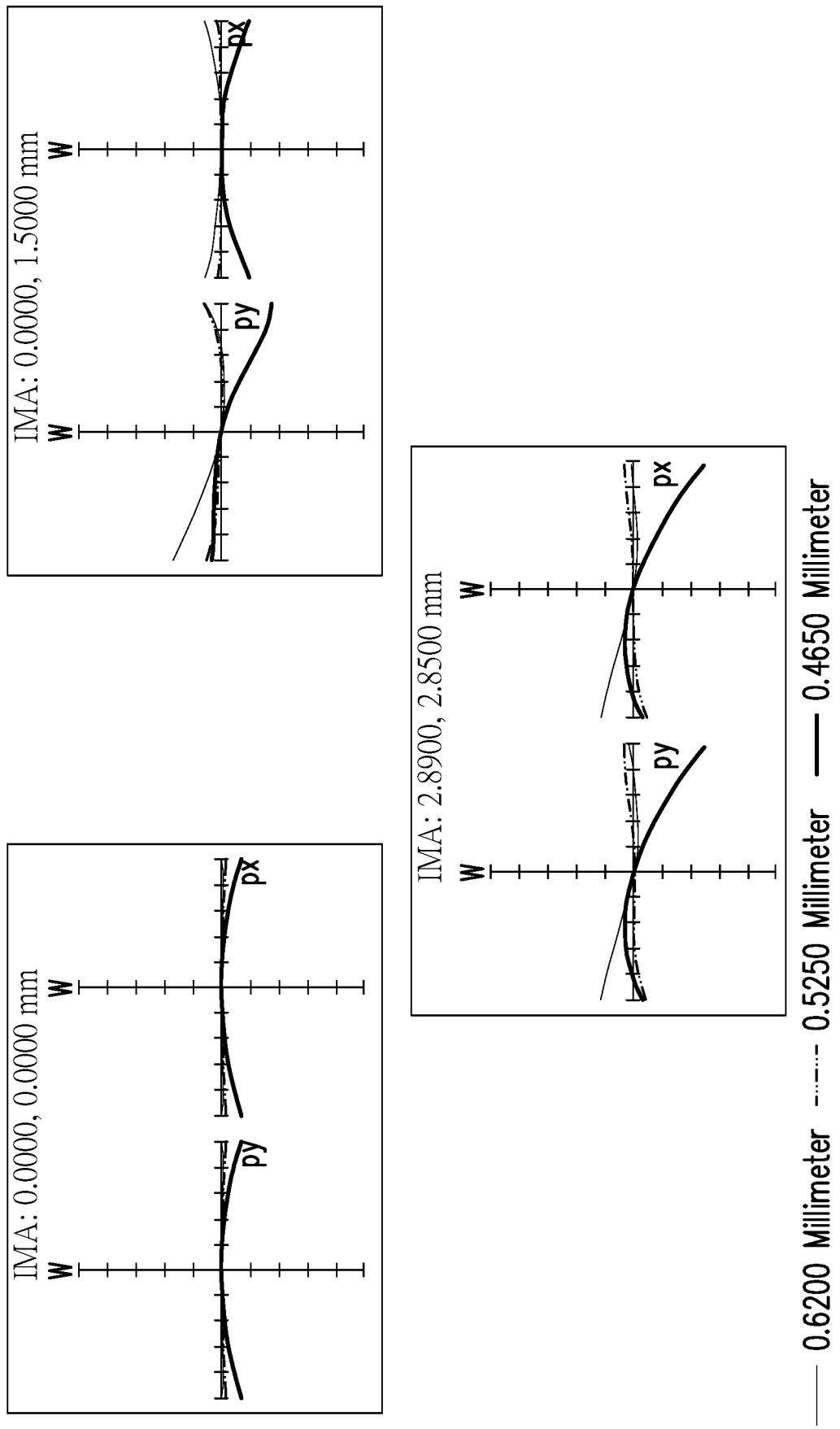
FIG. 6D is an optical path difference (OPD) diagram of the optical lens of the head-mounted display device of FIG. 5.

FIG. 6A is an astigmatic field curvature diagram and a distortion diagram of the optical lens of the head-mounted display device of FIG. 5. FIG. 6B is a lateral color aberration diagram of the optical lens of the head-mounted display device of FIG. 5 FIG. 6B shows simulation data based on light beams of wavelengths of 465 nm, 525 nm, and 620 nm. The horizontal coordinates represent lateral color aberrations, and the vertical coordinates represent image heights. FIG. 6C is a modulation transfer function curve diagram of the optical lens of the head-mounted display device of FIG. 5. The horizontal coordinates represent focus shifts, and the vertical coordinates represent moduli of an optical transfer function (OTF). FIG. 6D is an optical path difference (OPD) diagram of the optical lens of the head-mounted display device of FIG. 5. The figures shown in FIG. 6A to FIG. 6D are all within a standard range, and it is verified that the optical lens 410 of the embodiment may achieve a better imaging effect. Moreover, as shown in FIG. 6D, on an active surface of the image generator 150, an OPD range of the image light beam IM is −2.0λ<OPD<2.0λ. OPD is an optical path difference at each field angle, λ is a wavelength of each color light, and the image light beam IM includes red light, green light, and blue light. In the embodiment, the design of the optical lens 410 is complied with a preset specification, so that the optical lens 410 has a smaller size, a lighter weight, a larger viewing angle and/or a higher resolution.

In summary, the embodiments of the invention have at least one of following advantages or effects. In the exemplary embodiments of the invention, the design of the optical lens is complied with the preset specification, so that the optical lens of the invention may have a smaller size, a lighter weight, a larger viewing angle and/or a higher resolution.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical lens, comprising:
a first lens, a second lens, a third lens, a fourth lens, and a fifth lens sequentially arranged from a light exit side to a light incident side, wherein an image generator is disposed at the light incident side, the optical lens is configured to receive an image light beam provided by the image generator, wherein a stop is formed at the light exit side, and wherein the image light beam has a minimum light beam cross-sectional area at the stop,
wherein the first lens is a biconvex lens, the second lens is a convexo-concave lens, the third lens is a biconcave lens, the fourth lens is a biconvex lens, and the fifth lens is a biconvex lens.

2. The optical lens of claim 1, wherein the optical lens is complied with B×D<130 mm$^2$, wherein B is a total length of the optical lens, and D is a clear aperture of a largest lens in the optical lens.

3. The optical lens of claim 1, wherein the optical lens is complied with A+C<20 mm, wherein A is a distance between the stop and the optical lens along an optical axis, and C is a distance between the optical lens and the image generator along the optical axis.

4. The optical lens of claim 1, wherein the optical lens is complied with FOV/(B×D)>0.4 degrees/mm$^2$, wherein B is a total length of the optical lens, D is a clear aperture of a largest lens in the optical lens, and FOV is a field angle of the optical lens.

5. The optical lens of claim 1, wherein the optical lens is complied with FOV>50 degrees, wherein FOV is a field angle of the optical lens.

6. The optical lens of claim 1, wherein refractive powers of the first lens, the second lens, the third lens, the fourth lens, and the fifth lens are sequentially positive, negative, negative, positive, and positive.

7. The optical lens of claim 1, wherein the first lens is a glass aspherical lens, the second lens is a glass aspherical lens, the third lens is a glass spherical lens, the fourth lens is a glass aspherical lens, and the fifth lens is a glass aspherical lens.

8. The optical lens of claim 1, wherein the first lens is a plastic aspherical lens, the second lens is a plastic aspherical lens, the third lens is a glass spherical lens, the fourth lens is a glass aspherical lens, and the fifth lens is a glass aspherical lens.

9. The optical lens of claim 1, wherein the third lens and the fourth lens are formed into a cemented lens.

10. The optical lens of claim 1, further comprising a first prism disposed between the optical lens and the stop, wherein the image light beam leaves the optical lens, passes through the first prism, and is converged at the stop, wherein the image light beam is diverged after passing through the stop.

11. The optical lens of claim 1, wherein the stop is formed at a coupling entrance of a waveguide element, and wherein the image light beam enters the waveguide element via the coupling entrance after passing through the stop and is transmitted to a coupling exit of the waveguide element followed by being projected to a target.

12. The optical lens of claim 1, wherein the optical lens is complied with following conditions:
B×D<130 mm$^2$,
A+C<20 mm,
FOV/(B×D)>0.4 degrees/mm$^2$,
FOV>50 degrees,
wherein A is a distance between the stop and the optical lens along an optical axis, B is a total length of the optical lens, C is a distance between the optical lens and the image generator along the optical axis, D is a clear aperture of a largest lens in the optical lens, and FOV is a field angle of the optical lens, and wherein a shape of the stop is a circle.

13. A head-mounted display device, comprising: an optical lens, an image generator, a stop, and a waveguide element, wherein,
the optical lens comprises a first lens, a second lens, a third lens, a fourth lens, and a fifth lens sequentially arranged from a light exit side to a light incident side, wherein the first lens is a biconvex lens, the second lens is a convexo-concave lens, the third lens is a biconcave lens, the fourth lens is a biconvex lens, and the fifth lens is a biconvex lens;
the image generator is disposed at the light incident side, and the optical lens is configured to receive an image light beam provided by the image generator,
the stop is formed at the light exit side, wherein at the stop, the image light beam has a minimum light beam cross-sectional area, and
wherein the stop is formed at a coupling entrance of the waveguide element, the image light beam enters the waveguide element via the coupling entrance after passing through the stop and is transmitted to a coupling exit of the waveguide element followed by being projected to a target.

14. The head-mounted display device of claim 13, further comprising: a first prism disposed between the optical lens and the stop, wherein the image light beam leaves the optical lens, passes through the first prism, and is converged at the stop, wherein the image light beam is diverged after passing through the stop.

15. The head-mounted display device of claim 13, wherein the waveguide element further comprises optical microstructures disposed at the coupling exit and at the coupling entrance, and the optical microstructures at the coupling exit project the image light beam transmitted to the coupling exit to the target.

16. An optical lens, comprising:
a first lens, a second lens, a third lens, a fourth lens, and a fifth lens sequentially arranged from a light exit side to a light incident side, wherein an image generator is disposed at the light incident side, the optical lens is configured to receive an image light beam provided by the image generator, wherein a stop is formed at the light exit side, and wherein the image light beam has a minimum light beam cross-sectional area at the stop,
wherein the first lens is a glass aspherical lens, the second lens is a glass aspherical lens, the third lens is a glass spherical lens, the fourth lens is a glass aspherical lens, and the fifth lens is a glass aspherical lens.

17. An optical lens, comprising:
a first lens, a second lens, a third lens, a fourth lens, and a fifth lens sequentially arranged from a light exit side to a light incident side, wherein an image generator is disposed at the light incident side, the optical lens is configured to receive an image light beam provided by the image generator, wherein a stop is formed at the light exit side, and wherein the image light beam has a minimum light beam cross-sectional area at the stop,
wherein the first lens is a plastic aspherical lens, the second lens is a plastic aspherical lens, the third lens is a glass spherical lens, the fourth lens is a glass aspherical lens, and the fifth lens is a glass aspherical lens.

* * * * *